(12) United States Patent
Kronenberg et al.

(10) Patent No.: US 7,937,758 B2
(45) Date of Patent: May 3, 2011

(54) FILE ORIGIN DETERMINATION

(75) Inventors: Pierre-Michel Kronenberg, Boulder, CO (US); Derek Zahn, Boulder, CO (US)

(73) Assignee: Symantec Corporation, Mountain View, CA (US)

( * ) Notice: Subject to any disclaimer, the term of this patent is extended or adjusted under 35 U.S.C. 154(b) by 914 days.

(21) Appl. No.: 11/626,306

(22) Filed: Jan. 23, 2007

(65) Prior Publication Data

US 2007/0174911 A1      Jul. 26, 2007

Related U.S. Application Data

(60) Provisional application No. 60/762,359, filed on Jan. 25, 2006.

(51) Int. Cl.
*G08B 23/00* (2006.01)

(52) U.S. Cl. .............................. 726/22; 726/23; 726/24

(58) Field of Classification Search .................... 726/22, 726/23, 24
See application file for complete search history.

(56) References Cited

U.S. PATENT DOCUMENTS

| | | | |
|---|---|---|---|
| 5,062,045 A | 10/1991 | Janis et al. | |
| 5,440,723 A | 8/1995 | Arnold et al. | |
| 5,623,600 A * | 4/1997 | Ji et al. ............................. | 726/24 |
| 5,638,509 A | 6/1997 | Dunphy et al. | |
| 5,889,943 A * | 3/1999 | Ji et al. ............................. | 726/22 |
| 5,960,170 A * | 9/1999 | Chen et al. ........................ | 714/38 |
| 6,701,456 B1 | 3/2004 | Biessener | |
| 7,243,027 B2 * | 7/2007 | Ireland et al. ..................... | 702/6 |
| 7,269,851 B2 * | 9/2007 | Ackroyd ........................... | 726/24 |
| 7,430,638 B2 * | 9/2008 | Kellar ............................... | 711/118 |
| 2003/0079158 A1 | 4/2003 | Tower et al. | |
| 2003/0101381 A1 * | 5/2003 | Mateev et al. ................... | 714/38 |
| 2004/0167921 A1 * | 8/2004 | Carson et al. ................... | 707/102 |
| 2004/0177319 A1 | 9/2004 | Horn | |
| 2005/0091291 A1 * | 4/2005 | Kaler et al. ...................... | 707/203 |
| 2005/0120063 A1 * | 6/2005 | Koestler .......................... | 707/204 |

(Continued)

FOREIGN PATENT DOCUMENTS

WO      WO0073880 A1      12/2000

(Continued)

OTHER PUBLICATIONS

Notification of Transmittal of the International Search Report and the Written Opinion of the International Searching Authority, or the Declaration (Jul. 17, 2008).

*Primary Examiner* — Edan Orgad
*Assistant Examiner* — Bradley Holder
(74) *Attorney, Agent, or Firm* — Holland & Hart LLP (57) ABSTRACT

An origin of a file of interest on a computer system is determined by monitoring file origin events on the computer system. A file of interest resulting from one of the file origin events may then be selected for tracing. A precursor file from which the file of interest emanates as a result of one of the file origin events is then identified. By iteratively performing the identifying operation upon successive precursor files substituted in the identifying operation for the file of interest, an origin file with no further precursor file may thus be identified. It is thus possible to trace back a given process or file of interest to a file container and/or location that initially introduced it into the computer system and any intermediate files or forms the process or file of interest may have assumed.

30 Claims, 5 Drawing Sheets

U.S. PATENT DOCUMENTS

| | | |
|---|---|---|
| 2005/0125730 A1* | 6/2005 | Goddard et al. ............... 715/531 |
| 2005/0188272 A1* | 8/2005 | Bodorin et al. ................ 714/38 |
| 2005/0251540 A1 | 11/2005 | Sim-Tang |
| 2006/0053492 A1 | 3/2006 | Wallace |
| 2006/0123010 A1 | 6/2006 | Landry et al. |
| 2006/0161982 A1* | 7/2006 | Chari et al. .................... 726/23 |
| 2006/0179484 A1 | 8/2006 | Scrimsher et al. |
| 2007/0006304 A1* | 1/2007 | Kramer et al. ................. 726/22 |
| 2007/0067842 A1* | 3/2007 | Greene et al. .................. 726/24 |
| 2007/0150957 A1* | 6/2007 | Hartrell et al. ................. 726/24 |
| 2007/0157315 A1* | 7/2007 | Moran ............................ 726/23 |
| 2008/0209562 A1* | 8/2008 | Szor ............................... 726/24 |

FOREIGN PATENT DOCUMENTS

| | | |
|---|---|---|
| WO | WO2005026874 A2 | 3/2005 |
| WO | WO2006076520 A2 | 7/2006 |

* cited by examiner

FILE ORIGIN DETERMINATION

CROSS REFERENCE TO RELATED APPLICATIONS

This application claims priority pursuant to 35 U.S.C. §119 (e) to U.S. provisional application No. 60/762,359 filed 25 Jan. 2006, which is hereby incorporated herein by reference in its entirety.

BACKGROUND OF THE INVENTION

The Internet has given users and companies access to an ever growing network of information and services. Millions of computers are connected in this vast worldwide network and more computers are being added daily. If the Internet has allowed a form of liberation, it also has attracted the attention of rogue programmers interested in deploying malicious and disruptive contents.

Current and traditional security solutions are dependant on digital signatures for each and every piece of malicious software, e.g., viruses, worms, Trojans, and spyware (collectively "malware"), to uniquely recognize and contain attacks while producing a very small number of false positives (false detections). These security solutions thus need to be constantly updated to understand and be able to handle ever more aggressive and fast propagating malware. During the first hours (and even days) of a new attack, computers waiting for updated malware signatures are left completely exposed to the new threats and indeed become infected in large numbers.

Anti-virus and anti-spyware companies have accelerated the process of protecting subscribers through the creation and delivery of malware detection signatures. However, these providers have now reached a point where additional optimization of their processes no longer yields measurable improvements to shorten the delivery of updates and protection. In contrast, malware propagation speeds have increased leaving computers more and more exposed. In the race of malware propagation versus the delivery of timely protection signatures, malware is often getting the upper hand.

For most malware attacks it is necessary to have users actually download and run the malware or a malware installation program, or extract and run a malware email attachment. While one could assume that users would not volunteer to perform such detrimental actions, clever social engineering which misleads users into installing malware without their understanding of the consequences has become prevalent and successful. An additional challenge for security solutions is thus to protect users from downloading and running malware or to help users by designating downloads as safe or malicious before a download is instantiated.

The information included in this Background section of the specification, including any references cited herein and any description or discussion thereof, is included for general reference purposes only and is not to be regarded subject matter by which the scope of the invention is to be bound.

SUMMARY

It is possible to significantly increase the speed at which malware detection signatures are generated and released, as well as create a map of Internet uniform resource locators (URLs) or other sources which resulted in safe or malicious downloads, by considering a new approach to the problem. The creation of malware signatures may be based on the detection of the malware and then an analysis and discovery of what file, intermediate file, or file container brought the malware into the computer system, and further which URL or other source was used to download the file, intermediate file, or file container. Similarly, identification of source files, intermediate files, containers, or locations of safe software downloads may be determined to provide contemporaneous or advance clearance of certain files.

Kernel-based, process monitoring software combined with user level operating system application protocol interface (API) hooks make monitoring every process running in a computer possible as well as logging any event, file relationship, process relationship, and other information related to the monitored processes. At any given time it is then possible to trace back a given process or file to the file container that initially introduced it into the computer system and any intermediate files or forms the process or file may have assumed. Note that the same principle can be used to trace back any process or file. The process or file does not need to be malware.

In one implementation, a method for determining an origin of a file on a computer system involves monitoring file origin events on the computer system. A file of interest resulting from one of the file origin events may then be selected for tracing. A precursor file from which the file of interest emanates as a result of the one of the file origin events is then identified. By iteratively performing the identifying operation upon successive precursor files substituted in the identifying operation for the file of interest, an origin file with no further precursor file may thus be identified.

This origin file determined as a result of this tracing-back capability provides very valuable information. For example, a signature or identifier for the origin file and intermediate files can be created and transferred over a network to a central server for redistribution to supplement traditional signatures in security solutions. In another example, the origin file and intermediate files may be uploaded to provide binary samples used for the creation of a signature or identifier at a remote site. Further, information about the URL or other source from which files, intermediate files, and container files were downloaded may be used to create a map which associates files with their origin. This map can be used to catalog files and origins or to categorize origins as resulting in safe or malicious downloads and thereby provide a basis for approval or blockage of downloads from a particular source location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION OF THE INVENTION

According to the methodologies described herein, it is possible to trace back a given process or file on a computer system to a container, e.g., a file or binary stream, that initially introduced it into the computer system and any intermediate files or forms the process or file may have assumed. For example, a relationship between the piece of program code that produces an objectionable behavior and the file responsible for delivering that code to the infected computer system may be deduced to aid in generating a signature identifying malware. This deduction involves following a file creation chain backwards from the program code to determine the file (or files) responsible for the existence of the malware or other file on the computer system. This file creation chain consists of links representing causal relationships between files.

Figure 1:
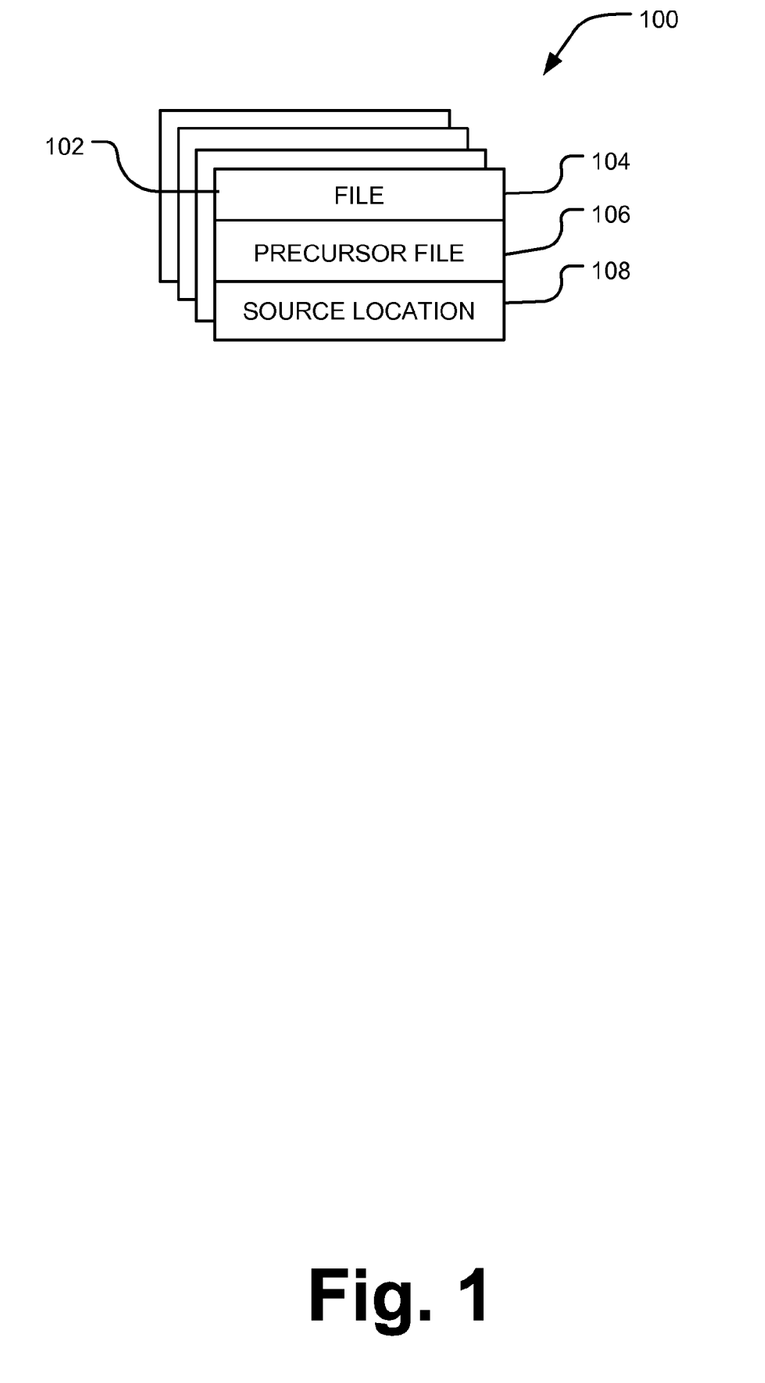
FIG. 1 is a schematic diagram illustrating an implementation of a relationship between a file and its origin as in the form of a database record.

Referring to the drawings, FIG. 1 illustrates an exemplary data structure, e.g., a file origin table 100, that may be used to organize and store such causal relationships. Each record 102 provides information about individual files of interest 104. Each file of interest 104 potentially has two different sources. A first source may be a precursor file 106 responsible for the contents of the file of interest 104. A second source may be a remote source location 108, for example, a location accessed via a network connection and identified by a URL, from which the contents of the file of interest 104 were obtained. Each entry in the table represents a causal link from the precursor file 106 and/or source location 108 to the newly created file of interest 100. Note that in most records 102, the remote source location 108 field will be empty as most file origin events (as further described below) causing the creation of file of interest 104 and a corresponding record 102 are related solely to precursor files 108 located on the local computer system rather than at a remote location.

Figure 2:
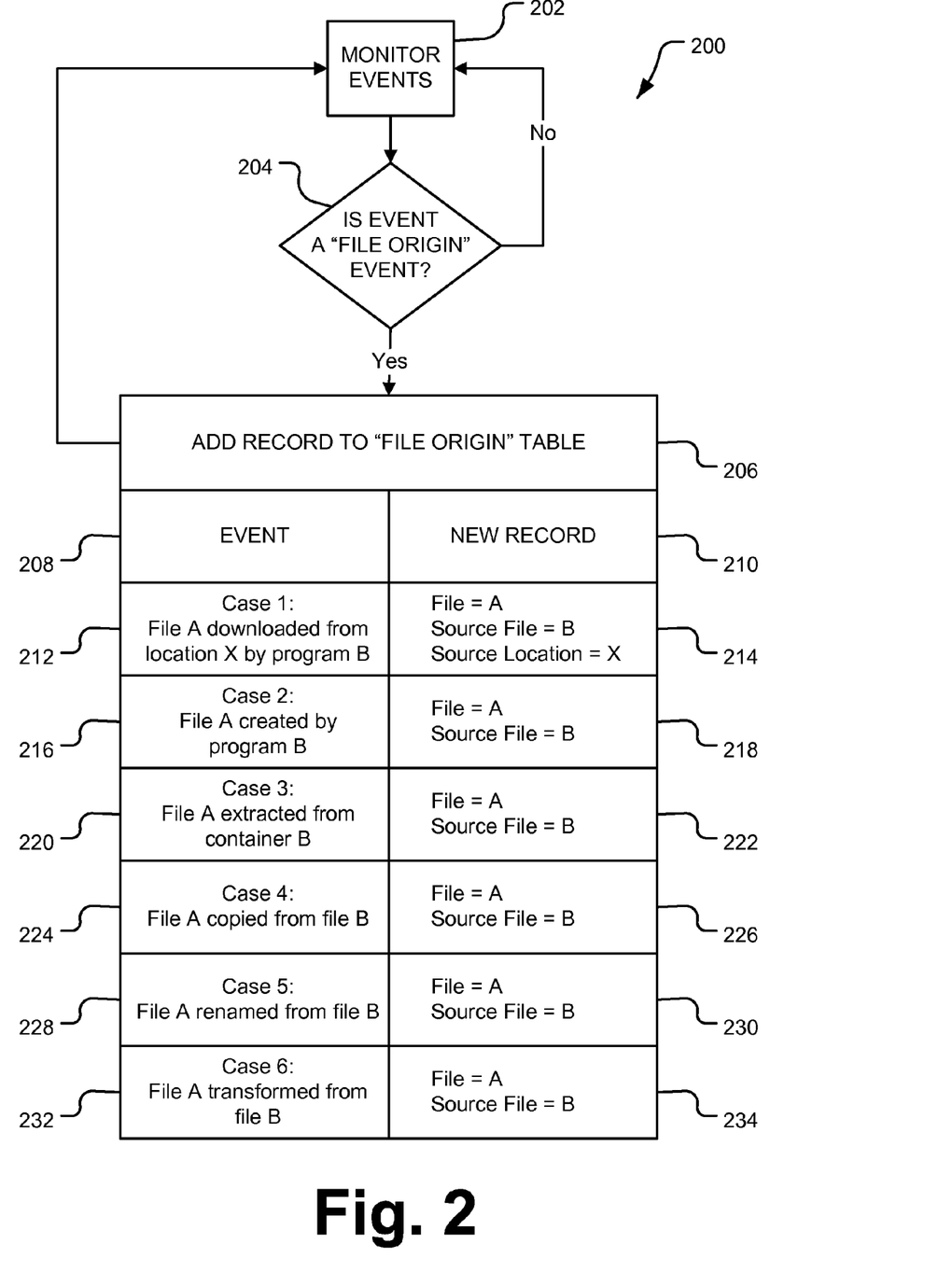
FIG. 2 is a flow diagram illustrating an implementation of a process for recording and maintaining file origin relationships.

During the operation of the computer system, file origin events may be monitored by the computer system to place entries in the file origin table 100, as illustrated in FIG. 2. The process 200 of FIG. 2 begins in a monitoring operation 202 in which system actions are constantly monitored. During the monitoring operation 202, in a determination operation 204 the process 200 identifies system actions designated as file origin events. Exemplary types of file origin events are described in greater detail below. If a file origin event is identified, in an addition operation 206 the process 200 adds a new record 210 corresponding to a particular type of event 208 to the file origin table 100 depicted in FIG. 1. Once the new record 210 is added to the file origin table 100, the process 200 returns to the monitoring operation 202 to continue monitoring additional processes in the computer system. If the determination operation 204 does not recognize a particular process as a file origin event, the process 200 also returns to the monitoring operation 202 to continue monitoring further processes.

The addition operation 206 interprets particular types of events 208 to determine how to populate a new record 210 as indicated in by the causal relationship chart between events 208 and new records 210 extending below the addition operation 206 in FIG. 2. A first file origin event 212 may be a file download event (Case 1). In this case, a program (B) causes a file (A) to be created whose contents originate from a source (X) external to the computer system. Examples of this case are e-mail clients storing attachments in local files, web browsers storing downloaded files, special-purpose software retrieving files from network sources using any protocol, or installation of a software program on the computer system from a computer-readable media source by and installation program. The relationship in this case is between the external source (X) and the downloaded file (A). The primary goal of the file origin determination process is to trace file creation relationships back to these (usually external) sources. A first record type 214 may then be stored in the file origin table 100 indicating the relationship between the file (A), the precursor file or source program (B), and the source location (X).

A second file origin event 216 triggering an origin record may be the creation of a file by an internal "program source" (Case 2). In this case, a program (B) causes a file (A) to be created and the contents of that file (A) are not derived from any other source. Self-extracting archive programs, monolithic setup applications, and any program that creates a document are examples of this type of file origin event. A second record type 218 may then be stored in the file origin table 100 indicating the relationship between the file (A) and the precursor file or source program (B). For these cases, the causal relationship thus leads from the newly-created file back to the program that created it.

A third file origin event 220 to investigate may be the extraction of a file (A) from a container file (B) (Case 3). In this case, the data for a new file (A) is created from the contents of another file (B) through an archive extraction mechanism. The clearest example of this is a file extracted from a zip archives A third record type 222 may then be stored in the file origin table 100 indicating the relationship between the file (A) and the precursor container file (B). In this case, the relationship to be saved has nothing to do with the program responsible for creating the new file (A). Rather it is the relationship between the container file (B) and the new file (A) that needs to be identified and stored.

A fourth file origin event 224 may be the result of a file copy procedure (Case 4). Through normal program and system operation, files are often copied from one location to another. The relationship between the original file (B) and the copy file (A) may be stored to trace the copy file (A) back through the causal chain. A fourth record type 226 may then be stored in the file origin table 100 indicating the relationship between the copy file (A) and the original file (B).

A fifth file origin event 228 may be a file renaming procedure (Case 5). Similar to the file copy case, the relationship between the newly named file (A) and the prior named file (B) may be maintained to assist in the origin tracing process. Thus, a fifth record type 230 may then be stored in the file origin table 100 indicating the relationship between the renamed file (A) and the original file (B).

A sixth file origin event 232 may be a file transformation procedure (Case 6). In this case, a file is transformed from one type or state to another. Examples of such transformation processes may include encryption (or decryption) of a file, file compression (or decompression), compilation of a file, and translation of a file from one file type to another, e.g., from Microsoft® Word to WordPerfect®. The relationship between the transformed file (A) and the precursor file (B) may be maintained to assist in the origin tracing process. A sixth record type 234 may then be stored in the file origin table 100 indicating the relationship between the transformed file (A) and the precursor file (B).

Note that the first file origin event 212 creates relationships between the file of interest and both the program source and the accessed external data source, e.g., a URL or other external data source, both of which are noted in the record type 214 as Case 1. The next five relationships described above—i.e., program source and file (Case 2); container file and file (Case 3); precursor file and copied file (Case 4); precursor file and renamed file (Case 5); and precursor file and transformed file (Case 6)—are only between the precursor file and the resulting file of interest. No remote source location is recorded. The file origin events described in FIG. 2 are only exemplary and other file origin events may similarly be monitored for the purpose of creating file origin records. Additional file origin events may include, for example, file deletions, file modifications, file read events or other file access events, file attribute changes, and network connection events triggered by a program file. File origin records may be made upon the occurrence of any of these additional events and any further processing events within the computer system that may be considered file origin events worthy of tracking.

The creation of a file origin table as described above with respect to FIGS. 1 and 2 collects important information about the relationships between files and related precursor files and/or remote source locations. However, the origin table alone usually does not identify the initial origin file and source location related to any particular file of interest. This is because each record in the origin table only shows a relationship between an immediate precursor file and the file of interest. However, a file of interest may be the result of a series of file origin events with several intermediate precursor files between the file of interest and the initial origin file.

Figure 3:
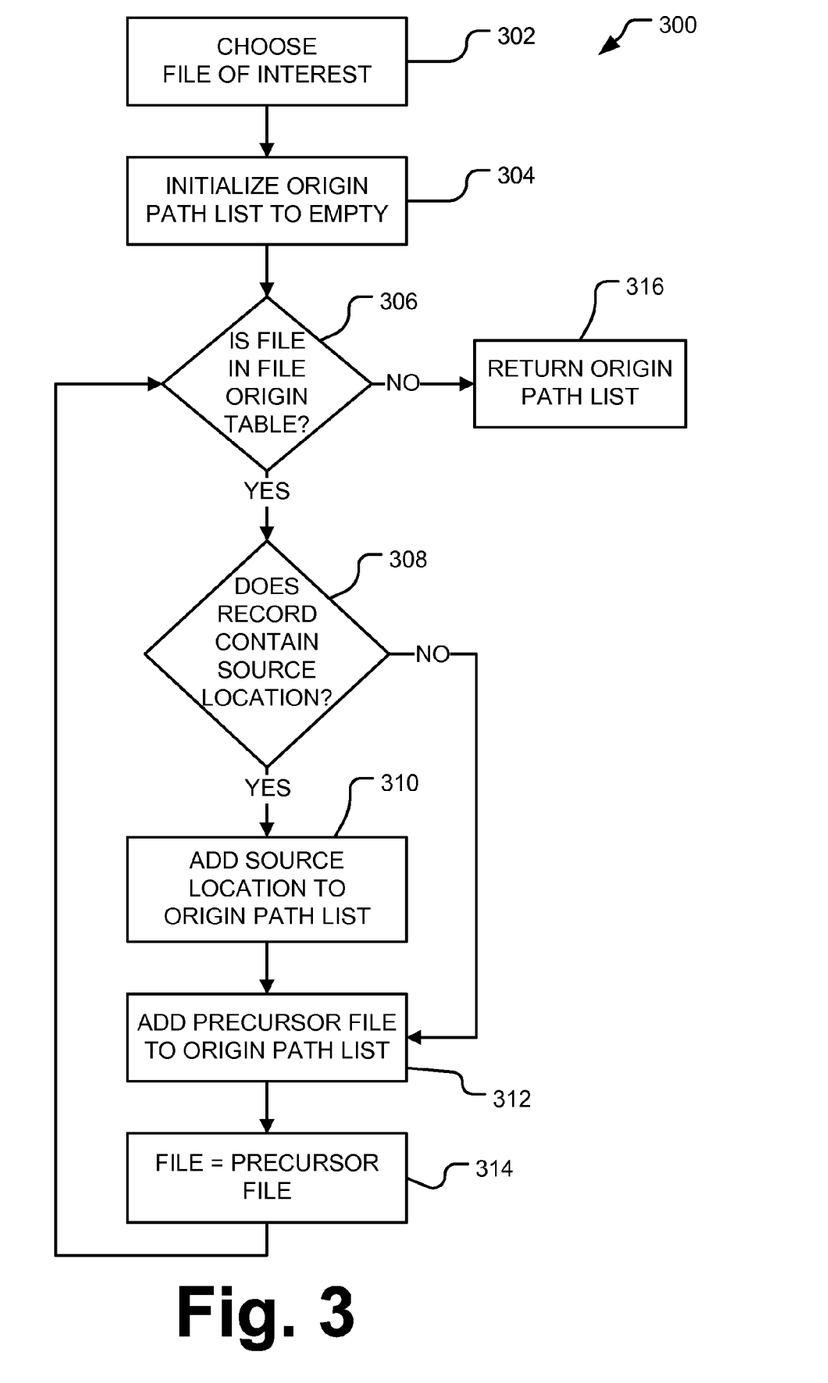
FIG. 3 is a flow diagram illustrating an implementation of a process for determining file origin by using the recorded file origin relationships.

A method 300 for deriving the initial origin of a file of interest is illustrated in FIG. 3. In a choosing operation 302, the file of interest for which an initial origin file is to be found is chosen. Next in an initialization operation 304 a file origin path list is initialized to an empty state since no file relationship information is yet inferred. The file origin path list will be populated with a list of all records of precursor files in a chain from the file of interest to an initial origin file and source location that were the predecessors of the file of interest. In a first determination operation 306, beginning with the file of interest, records are looked up in the file origin table. If a record of the file of interest is not found within the file origin table, the origin trace is complete and the origin path list is returned as an empty set in return operation 316. This result may occur for example, if the file of interest was created before a file origin event monitoring process was implemented on the computer system. As such, no information about the creation of the file and relationships with precursor files will be available.

If the file of interest is found in the file origin table in the first determination operation 306, a second determination operation 308 is undertaken to determine whether the record of the file of interest contains a source location entry. If the record does contain a source location entry, then the source location is added to the origin path list in a first addition operation 310. Further, the precursor file associated in the same record with the source location is added to the origin path list in a second addition operation 312. Alternatively, if it is determined in the second determination operation 308 that a source location is not contained in a record, then the process 300 skips the first addition operation 310 and moves directly to the second addition operation 312 and adds only the precursor file information to the origin path list.

Once the entries in the origin path list are made, the process 300 replaces the file of interest with the precursor file identified in the record of the file of interest in a replacement operation 314. The process 300 then returns to the first determination operation 306 to determine whether a record exists in the file origin table for the precursor file. The process 300 continues iteratively in this fashion to trace the origin of each precursor file to the file of interest and add the origin information to the origin path list. When no record is found in the origin table for a particular precursor file, the process 300 is complete and the return operation 316 returns the origin path list with a listing of all the precursor files and presumably a remote source location related to the file of interest. In this way a causal chain of local events leading to the creation of the file of interest may be inferred from the origin events stored in the file origin table.

The determination of the origin file and source location related to a file of interest as indicated in the origin path list may then be used for any of a variety of purposes, for example, a signature or identifier for a container file and intermediate files can be created and transferred over a network to a central server for redistribution to supplement traditional signatures in security solutions. In another example, a container file and intermediate files may be uploaded to provide binary samples used for the creation of a signature or identifier at a remote site. Further, information about the URL or other source from which files, intermediate files, and container files were downloaded may be used to create a map which associates files with their origin similar to an installation log. This map can be used to catalog files and origins or to categorize origins as resulting in safe (e.g., a white list) or malicious (e.g., a black list) downloads and thereby provide a basis for approval or blockage of downloads from a particular source location. The determination process may also be used to implement or enforce organizational policies concerning restrictions on the use of or access to certain files on organizational computer systems. The determination process may allow a system administrator to trace the origin of identified restricted materials and implement employee sanctions or add additional blocking instructions to the computer system to prevent future access to the files.

Figure 4:
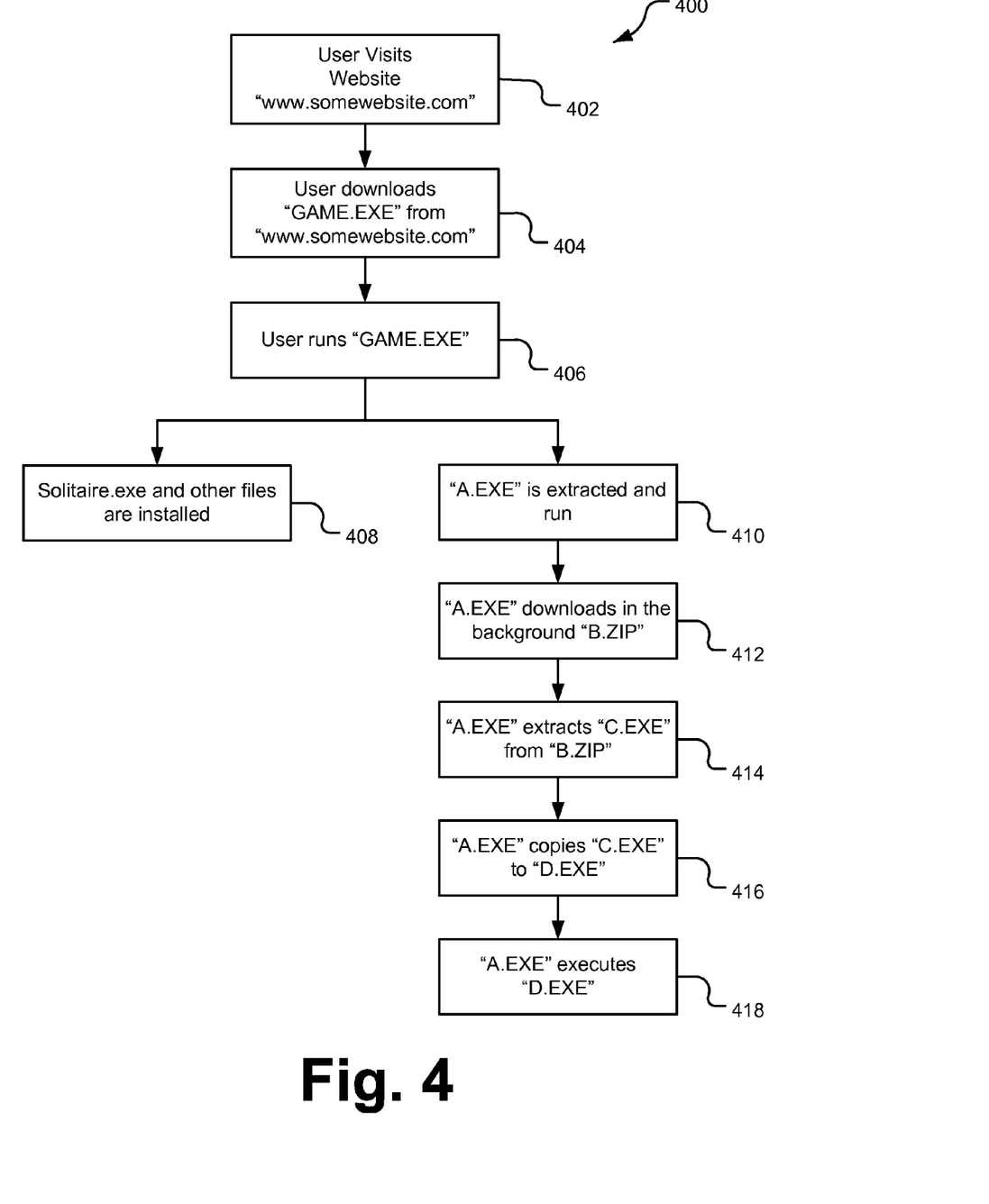
FIG. 4 is a flow diagram illustrating a representative series of exemplary behaviors of the type monitored for file origin determination.

For illustration purposes, in the following example of FIG. 4, the actions of a typical spyware program may be monitored by the file source identification process described above with respect to FIG. 2 and a record of the origin file and remote source location may be determined by the process of FIG. 3. This information may be used, for example, to identify sources of malicious files before the malicious files are installed on a computer system and prevent their installation or isolate such files and their effect by triggering well known malware quarantine and removal software. The sequence of events 400 presented in FIG. 4 illustrates the methods often used by malware in the course of its installation.

In a navigation operation 402, a user of a computer system navigates a web browser running on the computer system to visit a website, in this example <www.somewebsite.com>. In a download operation 404, the user downloads an installation executable (GAME.EXE) for a solitaire card game from the web site over the Internet to the user's computer system. This file is stored on the computer system. This is a Case 1 relationship between the external data source (i.e., the website), a program file (i.e., the web browser), and the file GAME.EXE. Thus, the monitoring program will create a record of this event and the associated files and source location in the file origin table.

In an execution operation 406, the user runs the installer file GAME.EXE. The installer file installs the card game SOLITAIRE.EXE as anticipated by the user in an installation operation 408. However, in a parallel and hidden installation operation 410, this installer file also creates another executable (A.EXE) that the solitaire card game vendor agreed to include with the program, but has nothing to do with the card game. Instead, this is a stub file that gives a spyware vendor access to the computer. This is a Case 2 relationship between the A.EXE, a created file, and GAME.EXE, a precursor program file. Again, the monitoring program will create a record of this event and the associated files in the file origin table.

The installer then executes A.EXE, which performs a download operation 412. As shown in the example of FIG. 4, A.EXE accesses the Internet and downloads an archive file (B.ZIP) containing the active components of the spyware. Using a method like this allows the spyware maker to update the spyware at will and also requires little overhead for the card game vendor. This is a Case 1 relationship between B.ZIP and A.EXE where A.EXE is the program source file, B.ZIP is the file of interest, and the spyware website is the remote source location. As before, the monitoring program will create a record of this event and the associated files and source location in the file origin table.

In a further extraction operation 414, A.EXE extracts a malware program (C.EXE) from B.ZIP. This is a Case 3 relationship between C.EXE, the extracted file, and B.ZIP, the container file. Since this is a defined file origin event, the monitoring program will also create a record of this event and the associated files in the file origin table.

Next in a copying operation 416, A.EXE copies C.EXE to a secure location on the computer system and chooses a random name for the new file (D.EXE). This is a Case 4 relationship between C.EXE, the precursor file, and D.EXE, the renamed file. Again, since this is a defined file origin event, the monitoring program will also create a record of this event and the associated files in the file origin table.

Now that D.EXE has been hidden within the computer system, A.EXE causes D.EXE to execute, and D.EXE performs a malicious behavior, which is detected. At this point, by following the chain of file relationships back from D.EXE, all of the intermediate files responsible for the creation of D.EXE may be identified. Signatures may thus be generated for all of these files (i.e., GAME.EXE, A.EXE, B.ZIP, C.EXE, D.EXE) or signatures may be generated for only the files with external origins (GAME.EXE and B.ZIP), as these files are the ones that network monitoring hardware or software would be able to detect.

A signature is generally a sequence of bytes that is unique to the malware file that can be identified during a network transmission, during a file copy procedure, or during a scan of the file on a computer system. The signatures may then be transmitted over a network, for example, the Internet to a central computer server for retransmission of the signatures to other computer systems with subscriptions to a malware protection service operated via the central server. The central server may only transmit a signature of the external data source if the protection model is to use network scanning (e.g., a firewall) to prevent the malware source file from reaching the user computer system. Other software operations associated with the malware protection service then use the signature to identify, and either prevent the reception and storage on a user computer of an external file that is the source of the malware, or contain and remove the source file of the malware if already saved on the user computer.

In order to identify the source of the malware, the malware itself needs to be identified. One exemplary methodology for identifying the presence of malware is to provide a user with a set of building blocks for developing sophisticated security defense rules. Users develop or modify rules that fit into a grammar. An exemplary grammar may consist of sources, events, actions, and exceptions.

A source may be a program, a non-interactive process, a network resource, an operating system service, etc. Events may be processes that pose a specific threat or behavior, for example, accessing objects, copying objects, deleting objects, and creating new objects at a specific rate. Events may also consist of monitoring activities, such as keystrokes, or many other suspicious or known bad activities. Actions may be to prevent file access, kill a process, disable a resource, send an alert, etc. Exceptions are useful for enabling activities that may seem suspicious, but are permissible for specific individuals or groups. In addition to creating their own rules, users can access a comprehensive set of pre-configured rules that can be tailored as needed.

Once the rules have been defined, the system enforces security policy rules regarding for example, the usage of specified files, network activity, and processes. The system programmatically detects new threat behavior and isolates and neutralizes instances throughout PCs on the network. The system logs activities and when rules trigger a programmatic threat response, all activities that led up to the activation of the rule can be examined for recovery. In one implementation of the logging feature, the system intelligently filters the list of activities in order to present the user with a targeted list containing the chain of triggering events.

Note that the primary purpose of the technology described herein is to identify the initial source or origin of malware before the malware is copied onto or instantiated on the computer system. Determination of how the malware operates or correction of any problems the malware creates on the user computer system may be provided by other known technologies, e.g., as generally described above, that may be used in conjunction with the origin determination technology disclosed herein.

Figure 5:
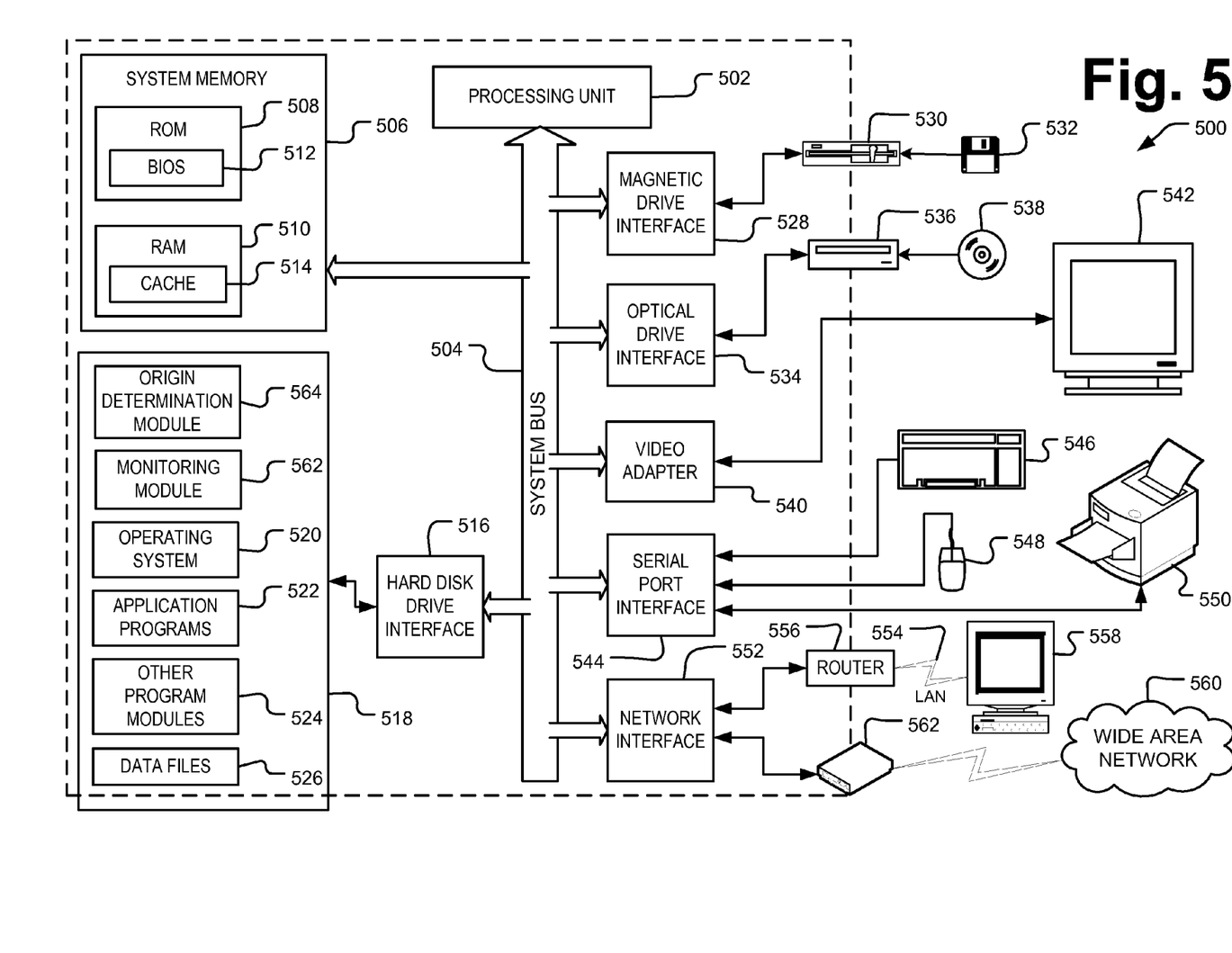
FIG. 5 is a schematic diagram of an exemplary computer system in which the file origin determination operations may be implemented.

An exemplary computer system 500 for implementing the file origin determination processes above is depicted in FIG. 5. The computer system 500 may be a personal computer (PC) with internal processing and memory components as well as interface components for connection with external input, output, storage, network, and other types of peripheral devices. Internal components of the computer system in FIG. 5 are shown within the dashed line and external components are shown outside of the dashed line. Components that may be internal or external are shown straddling the dashed line. Alternatively to a PC, the computer system 500 may be in the form of any of a notebook or portable computer, a tablet PC, a handheld media player (e.g., an MP3 player), a smart phone device, a video gaming device, a set top box, a workstation, a mainframe computer, a distributed computer, a server, an Internet appliance, or other computer devices, or combinations thereof.

The computer system 500 includes a processor 502 and a system memory 506 connected by a system bus 504 that also operatively couples various system components. There may be one or more processors 502, e.g., a single central processing unit (CPU), or a plurality of processing units, commonly referred to as a parallel processing environment. The system bus 504 may be any of several types of bus structures including a memory bus or memory controller, a peripheral bus, a switched-fabric, point-to-point connection, and a local bus using any of a variety of bus architectures. The system memory 506 includes read only memory (ROM) 508 and random access memory (RAM) 510. A basic input/output system (BIOS) 512, containing the basic routines that help to transfer information between elements within the computer system 500, such as during start-up, is stored in ROM 508. A cache 514 may be set aside in RAM 510 to provide a high speed memory store for frequently accessed data.

A hard disk drive interface 516 may be connected with the system bus 504 to provide read and write access to a data storage device, e.g., a hard disk drive 518, for nonvolatile storage of applications, files, and data. A number of program modules and other data may be stored on the hard disk 518, including an operating system 520, one or more application programs 522, other program modules 524, and data files 526. In an exemplary implementation, the hard disk drive 518 may further store a monitoring application module 562 for monitoring the file origin events and an origin determination module 564 for determining the origin of files according to the exemplary processes described herein above. Note that the hard disk drive 518 may be either an internal component or an external component of the computer system 500 as indicated by the hard disk drive 518 straddling the dashed line in FIG. 5. In some configurations, there may be both an internal and an external hard disk drive 518.

The computer system 500 may further include a magnetic disk drive 530 for reading from or writing to a removable magnetic disk 532, tape, or other magnetic media. The magnetic disk drive 530 may be connected with the system bus 504 via a magnetic drive interface 528 to provide read and write access to the magnetic disk drive 530 initiated by other components or applications within the computer system 500. The magnetic disk drive 530 and the associated computer-readable media may be used to provide nonvolatile storage of computer-readable instructions, data structures, program modules, and other data for the computer system 500.

The computer system 500 may additionally include an optical disk drive 536 for reading from or writing to a removable optical disk 538 such as a CD ROM or other optical media. The optical disk drive 536 may be connected with the system bus 504 via an optical drive interface 534 to provide read and write access to the optical disk drive 536 initiated by other components or applications within the computer system 500. The optical disk drive 530 and the associated computer-readable optical media may be used to provide nonvolatile storage of computer-readable instructions, data structures, program modules, and other data for the computer system 500.

A display device 542, e.g., a monitor, a television, or a projector, or other type of presentation device may also be connected to the system bus 504 via an interface, such as a video adapter 540 or video card. Similarly, audio devices, for example, external speakers or a microphone (not shown), may be connected to the system bus 504 through an audio card or other audio interface (not shown).

In addition to the monitor 542, the computer system 500 may include other peripheral input and output devices, which are often connected to the processor 502 and memory 506 through the serial port interface 544 that is coupled to the system bus 506. Input and output devices may also or alternately be connected with the system bus 504 by other interfaces, for example, a universal serial bus (USB), a parallel port, or a game port. A user may enter commands and information into the computer system 500 through various input devices including, for example, a keyboard 546 and pointing device 548, for example, a mouse. Other input devices (not shown) may include, for example, a microphone, a joystick, a game pad, a tablet, a touch screen device, a satellite dish, a scanner, a facsimile machine, and a digital camera, and a digital video camera. Other output devices may include, for example, a printer 550, a plotter, a photocopier, a photo printer, a facsimile machine, and a press (the latter not shown). In some implementations, several of these input and output devices may be combined into a single devices, for example, a printer/scanner/fax/photocopier. It should also be appreciated that other types of computer-readable media and associated drives for storing data, for example, magnetic cassettes or flash memory drives, may be accessed by the computer system 500 via the serial port interface 544 (e.g., USB) or similar port interface.

The computer system 500 may operate in a networked environment using logical connections through a network interface 552 coupled with the system bus 504 to communicate with one or more remote devices. The logical connections depicted in FIG. 5 include a local-area network (LAN) 554 and a wide-area network (WAN) 560. Such networking environments are commonplace in home networks, office networks, enterprise-wide computer networks, and intranets. These logical connections may be achieved by a communication device coupled to or integral with the computer system 500. As depicted in FIG. 5, the LAN 554 may use a router 556 or hub, either wired or wireless, internal or external, to connect with remote devices, e.g., a remote computer 558, similarly connected on the LAN 554. The remote computer 558 may be another personal computer, a server, a client, a peer device, or other common network node, and typically includes many or all of the elements described above relative to the computer system 500.

To connect with a WAN 560, the computer system 500 typically includes a modem 562 for establishing communications over the WAN 560. Typically the WAN 560 may be the Internet. However, in some instances the WAN 560 may be a large private network spread among multiple locations. The modem 562 may be a telephone modem, a high speed modem (e.g., a digital subscriber line (DSL) modem), a cable modem, or similar type of communications device. The modem 562, which may be internal or external, is connected to the system bus 518 via the network interface 552. In alternate embodiments the modem 562 may be connected via the serial port interface 544. It should be appreciated that the network connections shown are exemplary and other means of and communications devices for establishing a communications link between the computer system and other devices or networks may be used. Connection of the computer system 500 with a WAN 560 allows the monitoring program 562 the ability to both trace a file origin across one or more systems connected to the WAN 560, and to provide file origin information to a remote system, e.g., for the development and distribution of a malware signature.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for determining an origin of a file on a computer system comprising monitoring file origin events on the computer system;
   selecting a file of interest, on the computer system, resulting from one of the file origin events;
   identifying a first precursor file from a first record of a file origin table, wherein the file of interest emanates from the first precursor file as a result of the one of the file origin events;
   adding the first precursor file to a file origin path list, wherein the file origin path list comprises a list of records of one or more precursor files that are a predecessor of the file of interest, wherein the list of records is a chain of records from the file of interest to an origin file;
   substituting the first precursor file for the file of interest;
   iteratively performing the identifying operation upon successive precursor files substituted in the identifying operation for the previously identified file until the origin file with no further precursor file is identified;
   generating a signature for each of the precursor files added to the file origin path list;
   adding the signature for each precursor file to the file origin path list;
   receiving a request to download a file, wherein the file originates from at least one precursor file in the file origin path list; and
   determining whether to allow the file to download based on an analysis of the signature for the at least one precursor file in the file origin path list.

2. The method of claim 1 further comprising recording the file origin events in a data structure.

3. The method of claim 2 further comprising associating the precursor file and the file of interest with the one of the file origin events in the data structure.

4. The method of claim 1 further comprising identifying an origin location of the file of interest.

5. The method of claim 4 wherein the operation of identifying an origin location further comprises identifying a uniform resource locator associated with the origin location.

6. The method of claim 4 further comprising
   recording the file origin events in a data structure;
   associating the precursor file and the file of interest with the one of the file origin events in the data structure; and
   associating the origin location with the one of the file origin events in the data structure.

7. The method of claim 4, wherein the origin location is located within a remote computer system accessible via a network and the iterative operation further comprises performing the identifying operation upon successive precursor files within the remote computer system.

8. The method of claim 1, wherein either the precursor file, the origin file, or both comprises an external data source file.

9. The method of claim 1, wherein either the precursor file, the origin file, or both comprises a program source file.

10. The method of claim 1, wherein either the precursor file, the origin file, or both comprises a container file.

11. The method of claim 1, wherein either the precursor file, the origin file, or both comprises a copied file.

12. The method of claim 1, wherein either the precursor file, the origin file, or both comprises a renamed file.

13. The method of claim 1, wherein either the precursor file, the origin file, or both comprises a transformed file.

14. The method of claim 1 further comprising
   determining whether the file of interest is a malware file;
   compiling a list of origin files associated with any malware files; and
   preventing an occurrence of a file origin event associated with any origin file on the list.

15. The method of claim 1 further comprising
   determining whether the file of interest is a safe file;
   compiling a list of origin files associated with any safe files; and
   allowing an occurrence of a file origin event associated with any origin file on the list.

16. A method for determining an origin of malware on a computer system comprising:
   monitoring file origin events on the computer system;
   selecting a malware file of interest on the computer system, resulting from the monitored file origin events;
   identifying a first precursor file from a first record of a file origin table, wherein the malware file emanates from the first precursor file as a result of the one of the file origin events;
   adding the first precursor file to a file origin path list, wherein the file origin path list comprises a list of records of one or more precursor files that are a predecessor of the malware file, wherein the list of records is a chain of records from the malware file to an origin file;
   substituting the first precursor file for the file of interest;
   iteratively performing the identifying operation upon successive precursor files substituted in the identifying operation for the previously identified file until the origin file with no further precursor file is identified;
   generating a signature for each of the precursor files added to the file origin path list;
   adding the signature for each precursor file to the file origin path list;
   receiving a request to download a file, wherein the file originates from at least one precursor file in the file origin path list; and
   determining whether to allow the file to download based on an analysis of the signature for the at least one precursor file in the file origin path list.

17. The method of claim 16, wherein the identifying operation further comprises
   maintaining a database file of relationships between the malware file, the origin file, and the one or more of the file origin events.

18. The method of claim 16 further comprising identifying an origin location of the malware file.

19. The method of claim 16, wherein the origin file comprises an external data source file.

20. The method of claim 16, wherein the origin file comprises a program source file.

21. The method of claim 16, wherein the origin file comprises a container file.

22. The method of claim 16, wherein the origin file comprises a copied file.

23. The method of claim 16, wherein the origin file comprises a renamed file.

24. The method of claim 16, wherein the origin file comprises a transformed file.

25. The method of claim 16 wherein the detecting operation further comprises recognizing malicious behavior on the computer system caused by the malware file.

26. The method of claim 16 further comprising creating a signature for the origin file.

27. The method of claim 16 further comprising transmitting a signature to a central server via a network connected to the computer system.

28. A computer system for determining an origin of a file on a computer system comprising:
- a processor;
- a data storage device;
- a monitoring module stored within the data storage device and executed by the processor that monitors file origin events on the computer system and records the file origin events in a data structure within the data storage device; and
- an origin determination module stored within the data storage device and executed by the processor that
  - selects a file of interest resulting from one of the file origin events,
  - identifies a first precursor file from a first record of a file origin table, wherein the file of interest emanates from the first precursor file as a result of the one of the file origin events,
  - adds the first precursor file to a file origin path list, wherein the file origin path list comprises a list of records of one or more precursor files that are a predecessor of the file of interest, wherein the list of records is a chain of records from the file of interest to an origin file,
  - substitutes the first precursor file for the file of interest,
  - iteratively identifies successive precursor files substituted for the previously identified file until the origin file with no further precursor file, an origin location, or both are identified;
  - generating a signature for each of the precursor files added to the file origin path list;
  - adding the signature for each precursor file to the file origin path list;
  - receiving a request to download a file, wherein the file originates from at least one precursor file in the file origin path list; and
  - determining whether to allow the file to download based on an analysis of the signature for the at least one precursor file in the file origin path list.

29. The computer system of claim 28, wherein when executed by the processor the origin determination module further
- associates the precursor file and the file of interest with the one of the file origin events in the data structure; and
- associates the origin location with the one of the file origin events in the data structure.

30. The computer system of claim 28 further comprising a network connection, wherein
- the origin location is located within a remote computer system accessible by the computer system over a network via the network connection; and
- origin determination module further identifies the successive precursor files within the remote computer system to identify the origin file.

* * * * *